(12) United States Patent
Chantz

(10) Patent No.: US 11,606,143 B2
(45) Date of Patent: Mar. 14, 2023

(54) WAVEFORM TRANSMISSION AND EVENT DETECTION

(71) Applicant: International Business Machines Corporation, Armonk, NY (US)

(72) Inventor: Hyman David Chantz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 17/009,814

(22) Filed: Sep. 2, 2020

(65) Prior Publication Data
US 2022/0069911 A1     Mar. 3, 2022

(51) Int. Cl.
    *H04B 10/27*     (2013.01)
    *H04R 3/00*     (2006.01)
    *H04B 10/85*     (2013.01)
    *G10K 11/178*     (2006.01)

(52) U.S. Cl.
    CPC ........... *H04B 10/27* (2013.01); *G10K 11/178* (2013.01); *H04B 10/85* (2013.01); *H04R 3/007* (2013.01)

(58) Field of Classification Search
    CPC ....... H04B 10/27; H04B 10/85; G10K 11/178
    See application file for complete search history.

(56) References Cited

U.S. PATENT DOCUMENTS

| | | | |
|---|---|---|---|
| 435,951 A | 9/1890 | Rust | |
| 8,702,627 B2 | 4/2014 | Telfort | |
| 8,867,657 B1* | 10/2014 | Flake | H04L 25/03834 327/170 |
| 9,462,994 B2* | 10/2016 | Rogers | A61B 5/7203 |
| 2001/0046304 A1 | 11/2001 | Rast | |
| 2004/0037429 A1 | 2/2004 | Candioty | |
| 2014/0126732 A1 | 5/2014 | West | |
| 2016/0232774 A1* | 8/2016 | Noland | G08B 25/10 |
| 2016/0292993 A1* | 10/2016 | Kozloski | H04M 19/044 |
| 2020/0068316 A1* | 2/2020 | Kent | H04R 17/00 |
| 2020/0179704 A1* | 6/2020 | Willis | A61N 1/37217 |

OTHER PUBLICATIONS

Beauhd, "With a Laser, Researchers Say They Can Hack Alexa, Google Home or Siri" (nytimes.com), Posted on Monday Nov. 4, 2019 @07:20PM from the laser-pointer dept., Slashdot, 18 pages.

(Continued)

*Primary Examiner* — Dzung D Tran
(74) *Attorney, Agent, or Firm* — David K. Mattheis; Maeve Carpenter

(57) ABSTRACT

A system for improvement of waveform transmission and event detection includes a first transducer configured to receive acoustic waveforms, and a first transducer processor and transmitter configured to invert the phase of the received waveforms of the first transducer and transmit the inverted waveforms via light to a second transducer. The second transducer is configured to receive light waveforms from the first transducer processor and transmitter, receive acoustic waveforms from the second transducer, convert the first transducer light waveforms and the second transducer acoustic waveforms into electrical waveforms, and transmit a combined electrical waveform onwards.

19 Claims, 14 Drawing Sheets

(56) References Cited

OTHER PUBLICATIONS

Geraldo et al. "Acoustic monitoring of sodium boiling in a Liquid Metal Fast Breeder Reactor from autoregressive models", Nuclear Engineering and Design, Elsevier, 2014, 278, pp. 573-585, 0.1016/j.nucengdes.2014.07.026, hal-01298037.

Mell et al., "The NIST Definition of Cloud Computing", Recommendations of the National Institute of Standards and Technology, Special Publication 800-145, Sep. 2011, 7 pages.

Sugawara et al., "Light Commands: Laser-Based Audio Injection Attacks on Voice-Controllable Systems", 17 pages.

\* cited by examiner

WAVEFORM TRANSMISSION AND EVENT DETECTION

FIELD OF THE INVENTION

This disclosure relates generally to improvement of waveform transmission and event detection and relates particularly to combining received waveforms from first and second transducers, and transmitting an electrical waveform related to this combination.

BACKGROUND

Research shows that the common microphones in many household devices are susceptible to modulation by direct light beams. Such susceptibility has been used to demonstrate 'hacking' into such systems, by using light whose power is modulated in the audio spectrum.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable zero-shot cross-lingual transfer learning of natural language processing models.

Aspects of the invention disclose methods and systems associated with improvement of waveform transmission and event detection.

According to an embodiment of the present invention, a system includes a first transducer configured to receive acoustic waveforms, to convert the acoustic waveforms to electrical waveforms, and to transmit the electrical waveforms to a first transducer processor and transmitter. The first transducer processor and transmitter is configured to convert the received electrical waveforms into light waveforms, and to transmit the light waveforms to a second transducer. The second transducer is configured to receive the light waveforms received from the first transducer processor, convert the light waveforms to an electrical waveform, invert the phase of the electrical waveform, combine the inverted phase electrical waveform with an electrical waveform obtained from an acoustic waveform received by the second transducer, and to transmit the combined waveform onward as an electrical waveform.

According to another embodiment of the present invention, a method includes detecting acoustic waveforms on a first transducer; converting the acoustic waveforms to electrical waveforms and transmitting the electrical waveforms to a first transducer processor and transmitter. The first transducer processor and transmitter inverts the phase of the electrical waveform and transmits this inverted electrical waveform via light to a second transducer. The second transducer is configured to detect light waveforms and acoustic waveforms and convert the light waveforms and the acoustic waveforms to electrical waveforms. The second transducer combines the received inverted electrical waveforms of the first transducer with the electrical waveform obtained from an acoustic waveform of the second transducer and transmits the combined waveform onwards as an electrical waveform.

According to yet another embodiment of the present invention, the first transducer processor and transmitter is further configured to transmit a waveform to the second transducer via a laser beam.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
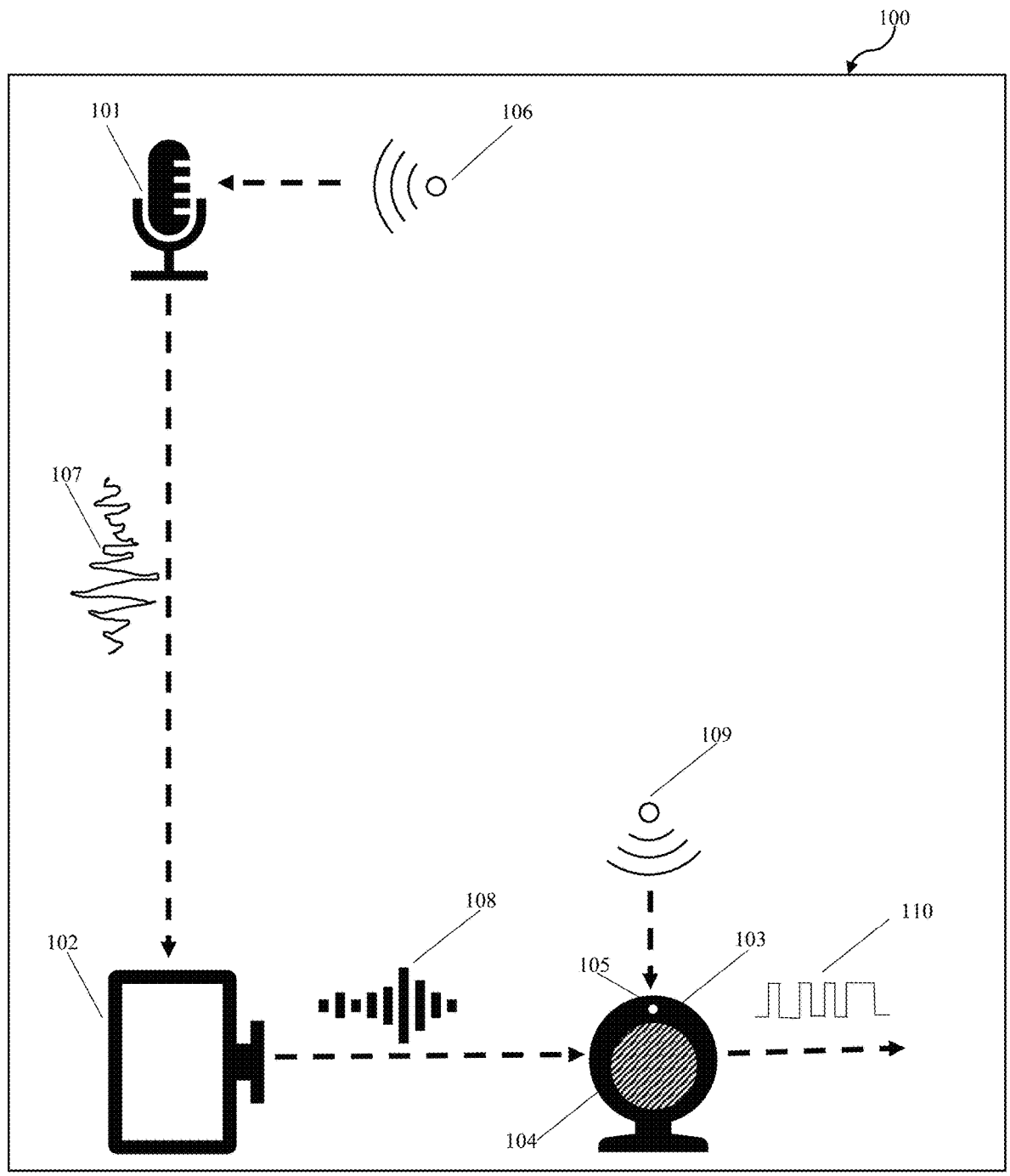
FIG. 1 depicts a system comprising a first transducer configured to receive acoustic waveforms, convert the acoustic waveforms into electrical waveforms, and transmit the electrical waveforms to a first transducer processor and transmitter; a first transducer processor and transmitter configured to convert the electrical waveforms into light waveforms, and to transmit said light waveforms to a second transducer; a second transducer configured to receive said light waveforms from the first transducer processor and transmitter, convert the light waveforms to received first transducer electrical waveforms; and the second transducer further configured to receive second transducer acoustic waveforms, and convert the second transducer acoustic waveforms to second transducer electrical waveforms; and to combine said second transducer electrical waveforms with said received first transducer electrical waveforms; and transmit these electrical waveforms onward as a combined electrical waveform, according to an embodiment of the invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 depicts a first transducer 101, which receives a first acoustic waveform 106. The first transducer converts said first transducer acoustic waveform into a first transducer electrical waveform 107 and transmits it to the first transducer processor and transmitter 102. The first transducer processor and transmitter 102 converts said first transducer electrical waveform 107 into a first transducer light waveform 108 and transmits this to a second transducer 103. This second transducer receives the first transducer light waveform 108 via a second transducer light sensing element 104, and converts this into an internal received first transducer electrical waveform 111.

In one embodiment the second transducer receives second acoustic waveform 109 by an acoustic receiver 105. The second transducer converts acoustic waveforms 109 into an internal second transducer electrical waveform 112, and combines internal received first transducer electrical waveform 111 and internal second transducer electrical waveform 112, and transmits these onward as a combined electrical waveform 110.

In an embodiment, first transducer 101, and second transducer acoustic receiver 105, are microphones.

In an embodiment, the first transducer 101 comprises an unpowered carbon, ceramic, crystal, or other microphone which converts acoustic waveforms 106 into a first transducer electrical waveform 107, and transmits said waveform to the first transducer processor and transmitter 102.

In another embodiment, the first transducer 101 comprises a powered electret, piezoelectric, solid state, capacitance, ribbon, sheet, or other microphone, which is electrically powered by a local power supply.

In yet another embodiment the first transducer 101 microphone is electrically powered by the first transducer processor and transmitter 102.

In an embodiment the first transducer 101 is an electrically powered and amplified microphone, for increased sensitivity to acoustic waveforms.

In an embodiment, the first transducer processor and transmitter 102 is configured as an amplifier for the first transducer electrical waveform 107, and as a light source modulator which modulates a light source power supply, and a light emitting diode (LED), incandescent, or fluorescent light source, and converts said first transducer electrical waveform 107 into a first transducer light waveform 108 and transmits this to said second transducer 103.

In an embodiment the first transducer process and transmitter 102 emitting light source is an LED, configured to rapidly follow a changing electrical waveform.

In an embodiment, the second transducer 103 comprises a photovoltaic receiver used as a second transducer light sensing element 104, and an acoustic receiver 105.

In one embodiment, the photovoltaic receiver used as second transducer light sensing element 104 may be an unpowered selenium photocell.

In another embodiment, the photovoltaic receiver used as second transducer light sensing element 104 may be a powered solid-state source.

In one embodiment, said second transducer 103 combines said electrical waveforms 111 and 112 in a summing amplifier in for onward transmission.

In an embodiment, second transducer 103 combines said electrical waveforms 111 and 112 in an integrated circuit operational amplifier.

In an embodiment, second transducer 103 combines said electrical waveforms 111 and 112 by feeding both input waveforms to resistors, and then to the control grid of an electronic tube.

In an embodiment, second transducer 103 combines said electrical waveforms 111 and 112 by feeding one or more input waveforms to the inputs of an audio mixer.

Both the first transducer 101 and the second transducer acoustic receiver 105 may be configured as microphones. The first transducer 101, the first transducer processor and transmitter 102, and the second transducer 103 may be co-located, or they may be separated in a room or other area.

The second transducer light sensing element 104 and acoustic receiver 105 may be constructed as a separate photodetector for second transducer light sensing element 104, and a microphone for second transducer acoustic receiver 105.

Certain microphones and transistorized and solid-state devices demonstrate greater activity if light is shown upon such devices when uncovered, or when heated. This is due, among other things, to increased vitality of transistor and Fermi N-P recombination, after additional light or heat energy is received.

In one embodiment second transducer acoustic receiver 105 comprises a solid-state electronic device which has its optically obscuring packaging scraped off and receives first transducer processor and transmitter optical waveform 108 and converts it into received first transducer electrical waveform 111.

In one embodiment second transducer acoustic receiver 105 comprises a solid-state electronic device which becomes a heat sensor by exposing the it without its heat sink to receives first transducer processor and transmitter optical waveform 108 and converts it into received first transducer electrical waveform 111.

In one embodiment a microphone can also be a light, vibration, or heat sensor, by exposing the microphone to light, vibration, or heat, respectively.

In an embodiment, the second transducer light sensing element 104 and acoustic receiver 105 may be constructed in one unit. In this embodiment, a solid-state device, without a covering, is susceptible to, and will receive, both light waveform 108 and acoustic waveform 109.

In one embodiment the first transducer processor and transmitter 102 transmitting the electrical waveform 107 to the second transducer 103 via laser beam waveform 210. When the first transducer 101 and second transducer 103 are separated and not co-located, this may provide better reception if room lights are turned on or off, or if there is interference from particularly bright lights such as those emanating from welding equipment, photogrammetry equipment, or sunlight.

Figure 3:
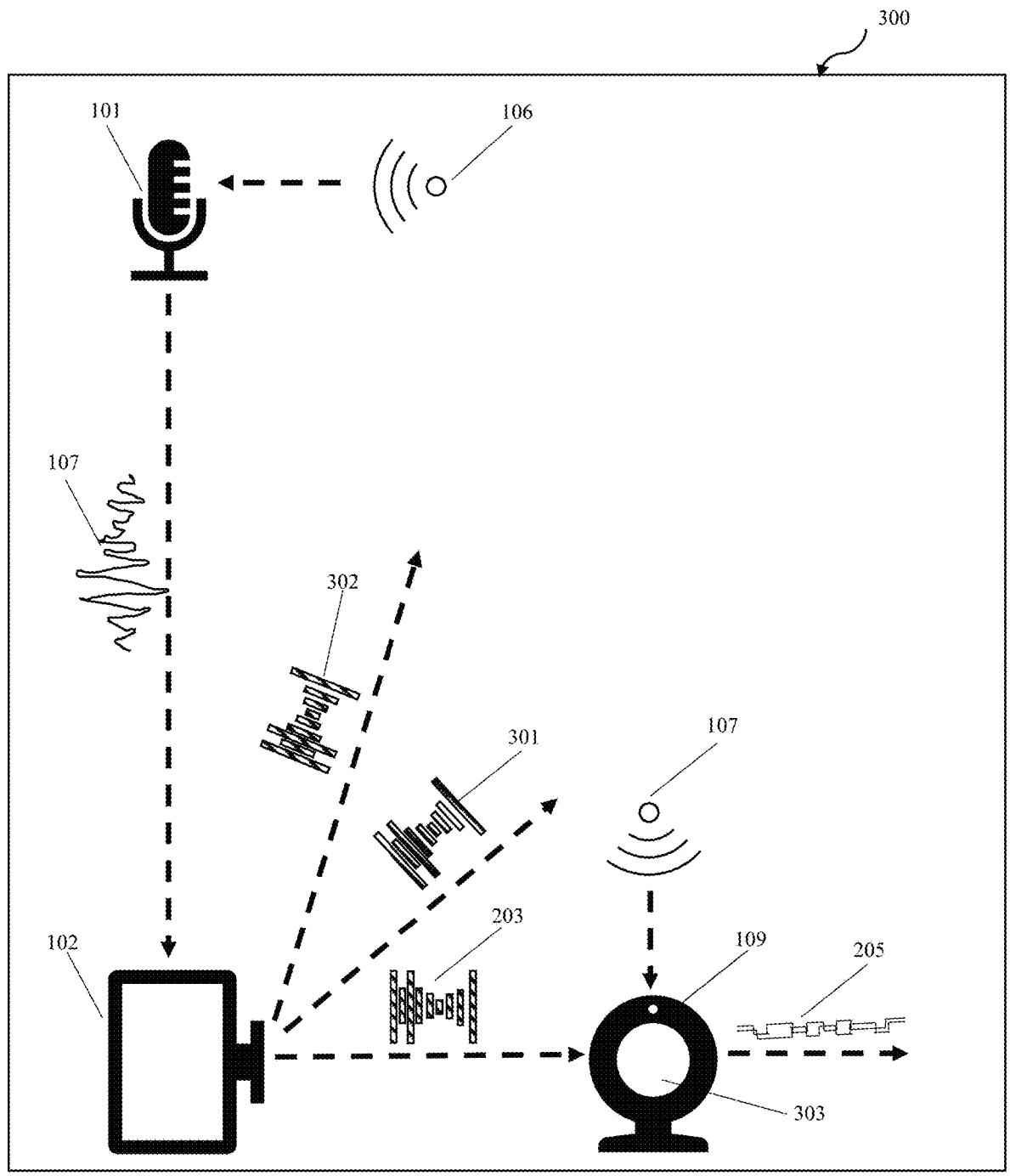
FIG. 3 depicts an omni-directional transmission of light waveforms of an electrical waveform by the first transducer processor and transmitter, according to an embodiment of this invention.

Illustration 200 of FIG. 3 depicts acoustic waveforms, light waveforms, laser waveforms, electrical waveforms, and radio frequency waveforms, according to embodiments of this invention.

In one embodiment, the first transducer 101 is configured to receive first transducer acoustic waveform 106, convert this into first transducer electrical waveform 107, and transmit this electrical waveform 107 to first transducer processor and transmitter 102. First transducer processor and transmitter 102 converts this electrical waveform 107 to first transducer light waveform 108, and transmits this via light to the second transducer 103.

In one embodiment, second transducer 103 is configured to convert light waveform 108 to internal received second transducer electrical waveform 112 It converts acoustic waveform 109 to internal second transducer electrical waveform 112. Second transducer 103 combines internal said electrical waveform 111 and said electrical waveform 112 to electrical waveform 110, which is transmitted onwards.

In another embodiment, second transducer 103 is configured to electrically invert internal electrical waveform 111 to become internal waveform 204, and combine this with non-inverted waveform 112 to result in electrical waveform 205, which is transmitted onwards.

In one embodiment, the electrical inversion of said electrical waveform 111 and the combining of this waveform with said electrical waveform 112 is done by applying electrical waveform 111 to the inverting input, and applying electrical waveform 112 to the non-inverting input, of an integrated circuit operational amplifier.

In another embodiment, second transducer 103 is configured to electrically invert waveform 112 and combines this with non-inverted waveform 111, to result in electrical waveform 207 which is transmitted onward.

In one embodiment, the combining of electrical waveform 111 and electrical waveform 112 is done by applying electrical waveform 112 to the inverting input and applying electrical waveform 111 to the non-inverting input, of an integrated circuit operational amplifier.

In yet another embodiment, first transducer processor and transmitter 102 is configured to receive electrical waveform 107, invert this in phase to become electrical waveform 201, and transmit this inverted waveform via light waveform 203 to second transducer light sensing element 104 in second transducer 103.

Figure 2:
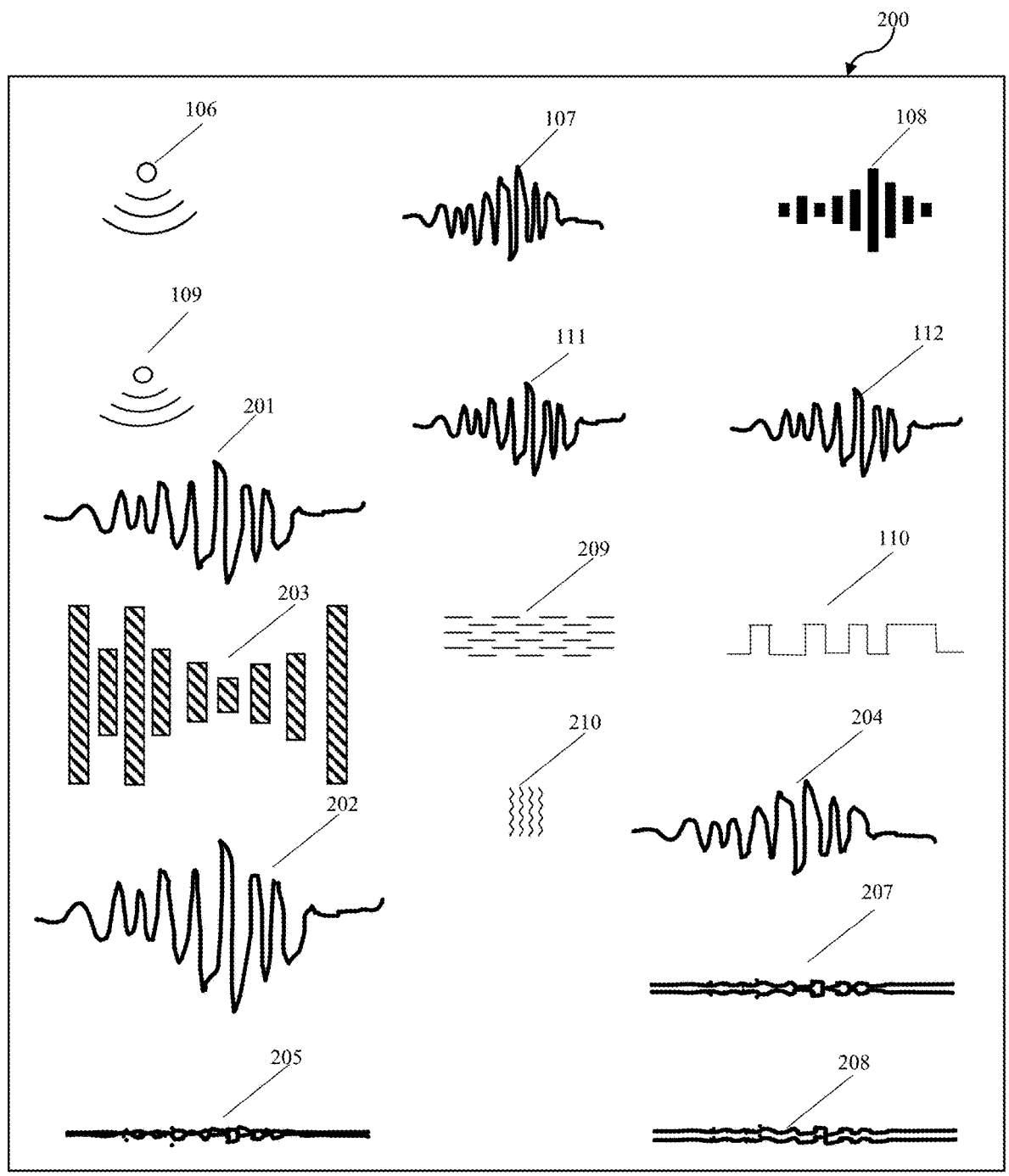
FIG. 2 depicts acoustic, electrical, light, laser and radio-frequency waveforms, according to embodiments of this invention.

Illustration 200 of FIG. 2 further depicts the waveforms of the second transducer 103 as configured to convert this received light waveform 203 to become electrical waveform 202.

In one embodiment, the second transducer 103 is configured to combine the electrical waveforms 202 and electrical waveform 204, into resulting electrical waveform 208. In this embodiment, as depicted in Illustration 400 of FIG. 4, the configuration is such that acoustic waveform 106 is received by first transducer 101 and sent as electrical waveform 107 to first transducer processor and transmitter 102. First transducer processor and transmitter 102 inverts electrical waveform 107 into an electrical waveform (waveform 201 of FIG. 3) and transmits this as light waveform 203 to second transducer 103. Second transducer 103 converts this to a fir internal received first transducer electrical waveform (waveform 202 of FIG. 3). Second transducer 103 receives acoustic waveform 109 and converts this to an internal second transducer electrical waveform (waveform 204 of FIG. 3). Second transducer 103 combines the first received first transducer electrical waveform and the second transducer electrical waveform, and transmits the combined waveform onwards, as electrical waveform 208.

In one embodiment, electrical waveform 208 is of significantly reduced amplitude, being the combination of electrical waveform 202 which has been derived from the inversion of acoustic waveform 106, and electrical waveform 204 derived from non-inverted acoustic waveform 109.

An embodiment of this internal combining is connecting waveforms 202 and 204 to the input of an integrated circuit operational amplifier, with waveform 208 being the combined electrical waveform output.

One application of this may result in a reduction of ambient noise on the waveform 208 transmitted onwards.

As depicted, the second transducer 103 is configured to generate the first electrical waveform, as an electrical complement of the electrical waveform 107 of the first acoustic waveform 106 of FIG. 2. This first electrical waveform (waveform 202 of FIG. 3) is an electrical inversion of the acoustic waveform of first acoustic waveform 106 of FIG. 3.

In one embodiment, electrical waveform 208 depicts the cancellation and counteraction of the waveforms of 'routine' acoustic waveforms going to specific microphones and transducers.

One embodiment includes a system within a room, or accessible to it. Within this room or accessible to it, one or more first transducer processors and transmitters 102 are pointed at the second transducer 103. These first transducer processor and transmitter 102 focuses modulated light, modulated radio frequency energy, or modulated heat at the second transducer 103. Although the first transducer processor and transmitters 102 do not primarily transmit acoustic energy, their waveforms in gross manifestation track the power output of an acoustic waveform. This is conceptually similar to the envelope output of a traditional "AM Radio" transmitter.

In one embodiment, out of phase cancellation is accomplished by combining electrical waveform 202 and electrical waveform 204 in an operational amplifier in second transducer 103.

In another embodiment, further out-of-phase cancellation is done manually, by phase adjustment by ear for minimal volume.

In another embodiment, further out-phase-cancellation is done automatically by calculating the height difference and direct distance from the first and second transducers, by calculating via Pythagorean Theorem a slant range of the absolute distance, by calculating the local speed-of-acoustic by referring to a nomograph of temperature, altitude and barometric pressure, and by transmitting the main acoustic components in such a way as the acoustic components may be received out-of-phase.

The retransmission phase may be controlled, or skewed in time, via an analogue system (capacitor delay), or by digital storage.

This entire system may optionally be continually optimized, by reiteratively improving its discrimination by adjusting its retransmissions dynamically, or with a preselected time-of-day offset of waveform amplitude and waveform delay.

Improvement of waveform transmission and detection may be useful in many situations. In some cases, improvements of waveform transmission and detection can enhance transmission of audio quality of local activity. In other cases, physical sensor systems, including security systems, are based on detection of acoustic events which are out-of-the-ordinary. These events may include such items as footfalls, glass breakage, unanticipated speech, ultrasonic fire 'crackle', subsonic vibration of structural issues, and other audio artifacts. A limiting factor to this detection has been the presence of ambient, or expected noise, or of consistent acoustics.

Embodiments of the present invention improve waveform detection, discernment and transmission. Some embodiments use light beams and other techniques to impinge on system microphones with out-of-phase recordings of ambient noise, out-of-phase waveforms associated with real-time ambient noise, or out-of-phase waveforms associated with other expected acoustic elements, and detected by a first transducer (microphone) inverted and transmitted to a second transducer. Some embodiments further perform electronic transmission of combined waveforms from primary and secondary transducers. Thus, the resulting acoustic spectrum is much quieter and nearer to "noise free". ("Noise" in this context is not only noise as commonly known, but any acoustic waveform which is not discriminated.) In such contexts, alarming or other waveform regimes may be used to improve security by detecting unexpected acoustic events.

In one embodiment, the second transducer 103 will adjust the absolute amplitude of the electrical waveform 202, of inverted light waveform 108 of the first transducer processor and transmitter 102 to be between 66% and 133% of the value of the absolute amplitude of electrical waveform 204 of the second acoustic waveform 109 of the second transducer.

In one embodiment, first transducer 101 and second transducer 103 make a recording of ambient noise in an empty room in which there are no footfalls, glass breakage, or other audio events.

In one embodiment, the recording is made by a digital audio recorder. This includes an input mechanism for each channel, a sampling mechanism for fidelity at least twice the highest significant frequency, (Nyquist ratio), a digital storage mechanism for the sampled audio, and a playback mechanism.

In one embodiment, this digital audio recorder samples at 50 kHz, and has 30 seconds of recording.

Illustration 300 of FIG. 3 depicts the first transducer processor and transmitter 102 sending multiple inverted light waveforms 301 and 302 in various directions, which optionally can be used for secondary transducers 303.

Figure 4:
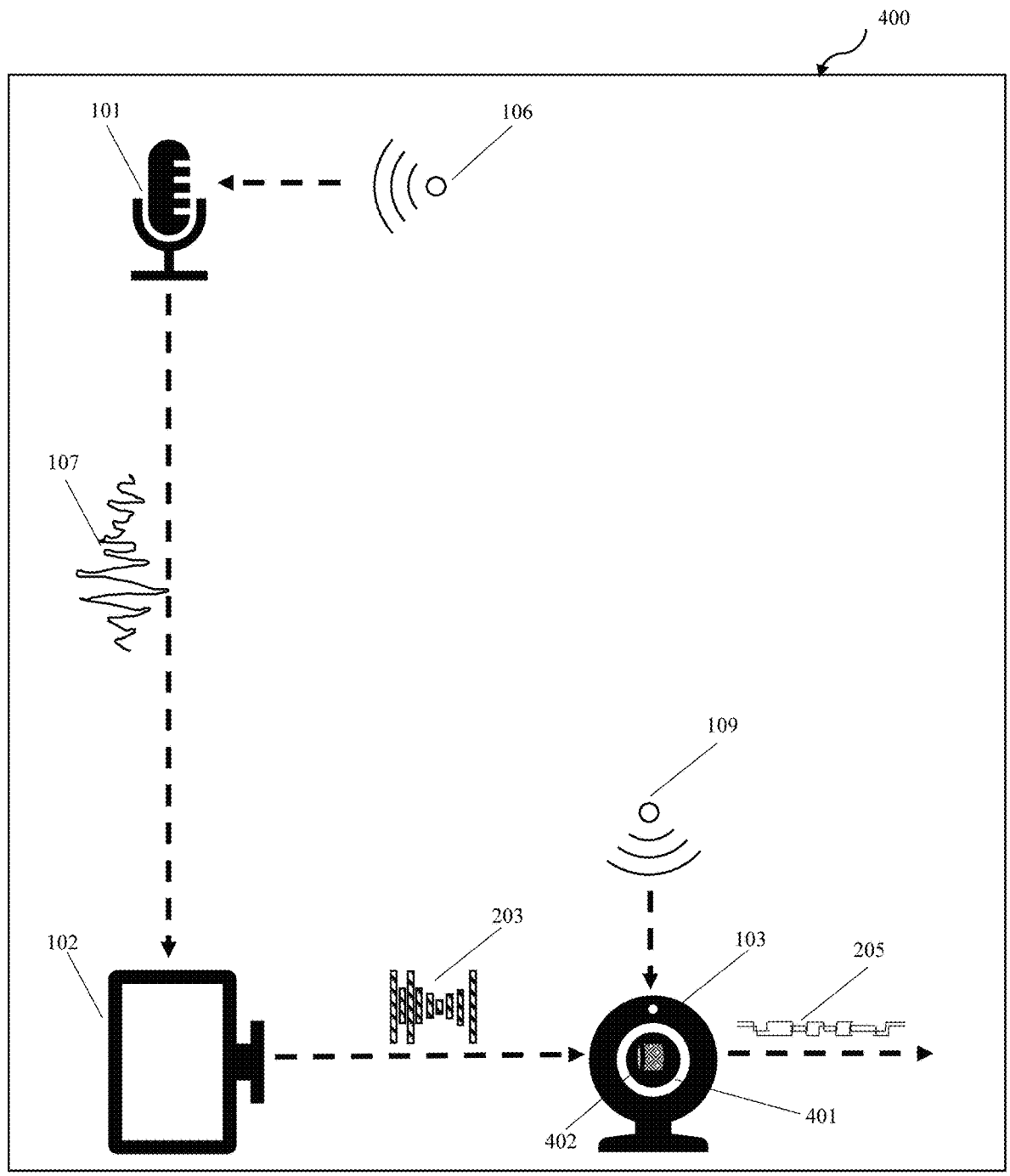
FIG. 4 depicts an aperture and a lens associated with the second transducer, to receive light waveforms from the first transducer processor and transmitter, according to an embodiment of this invention.

Illustration 400 of FIG. 4 depicts the second transducer 103 having an aperture 401 configured to receive light from a specific direction from the first transducer processor and transmitter 102. Aperture 401 is configured, pointed, baffled and directed in such a way as to reduce prominent, long-standing, or objectional light, other than light coming from the direction of first transducer processor and transmitter 102.

Illustration 400 of FIG. 4 further depicts the second transducer 103 having a lens 402 to improve reception of the light waveform 203 from first transducer processor and transmitter 102. Lens 402 is focused, configured, pointed and directed in such a way as to maximize light coming from first transducer processer and transmitter 102.

In an embodiment, the first transducer processor and transmitter 102 sends the electrical waveform 107 to the second transducer 103 via electromagnetic radiation above or below the frequencies of visible light with a waveform as schematically depicted in 209. In this configuration, the first transducer processor and transmitter has a generator of electromagnetic radiation, sends electromagnetic radiation and the second transducer receives this by a detector of electromagnetic radiation.

In one embodiment, some microphones and solid-state devices (transistors, etc.) demonstrate greater activity when such radiation impinges upon the devices.

In one embodiment, such transmission of electromagnetic radiation above or below the frequencies of visible light is configured for closed locations where no extraneous photonic light is permitted, including biological investigation areas, photographic laboratories, scintillation tracking areas, or plastic curing facilities.

Figure 5:
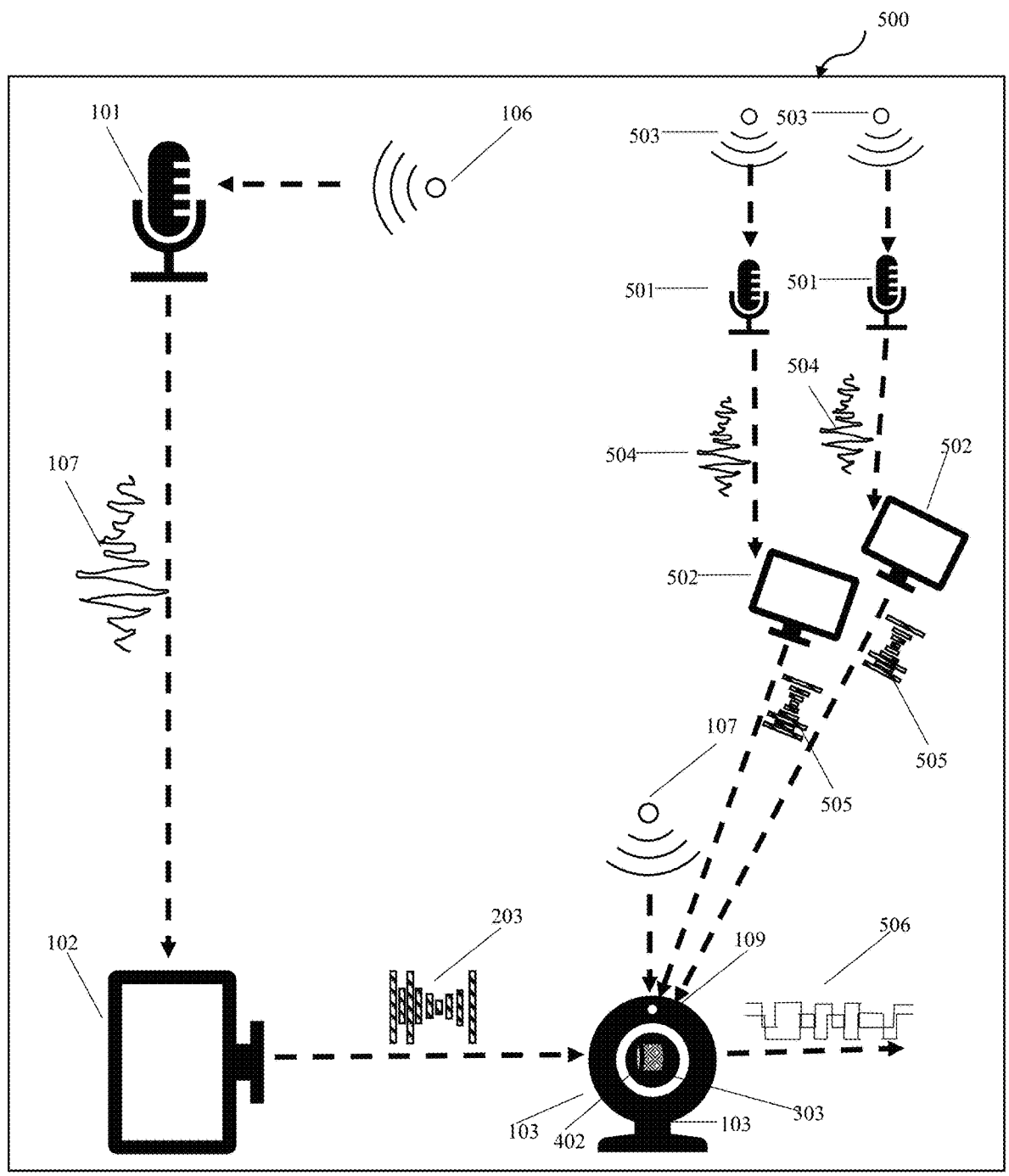
FIG. 5 depicts multiple first transducers and first transducer processors transmitting light to the second transducer, according to an embodiment of this invention.

Illustration 500 of FIG. 5 depicts multiple first transducers and first transducer processors sending inverted light waveforms to the second transducer 103. In this configuration, multiple primary transducers 501 receive local acoustic waveforms 503, and convert and send as electrical waveforms 504 to multiple primary transducer processors 502. Each primary transducer processor 502 inverts the electrical waveforms 504 to a light waveform 505 and sends light waveform 505 to second transducer 103. Second transducer 103 combines waveforms 505 and transmits the combined waveform onward as waveform 506.

Figure 6:
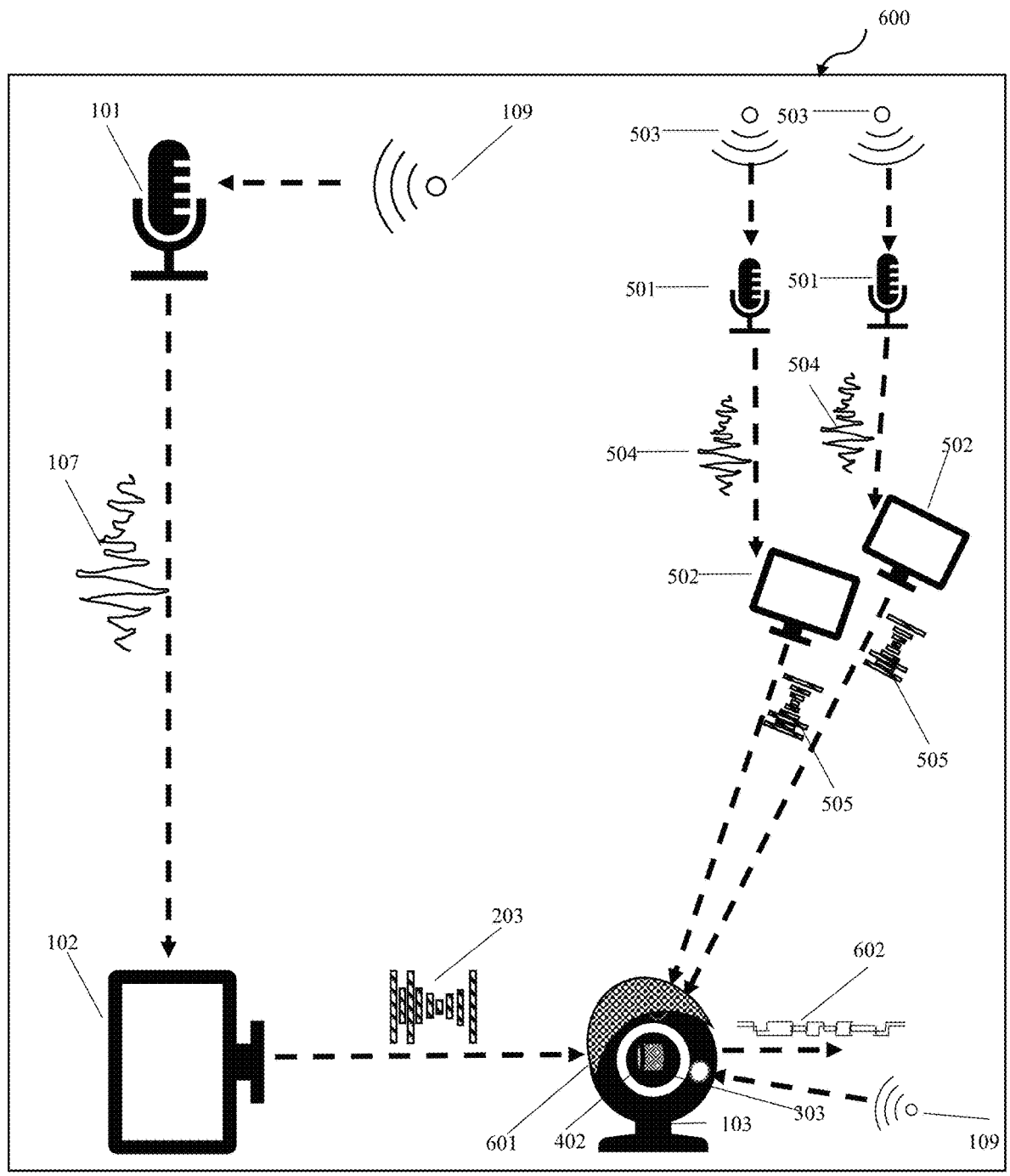
FIG. 6 depicts a multiple transducer processor associated with the second transducer, according to an embodiment of this invention.

Illustration 600 of FIG. 6 depicts a multiple transducer processor 601. Said multiple transducer processor 601 receives waveforms 505 from the various primary transducer processors 502, averages the amplitudes, transmits the waveforms to second transducer 103, and second transducer 103 transmits the waveforms onward as waveform 602.

Figure 7:
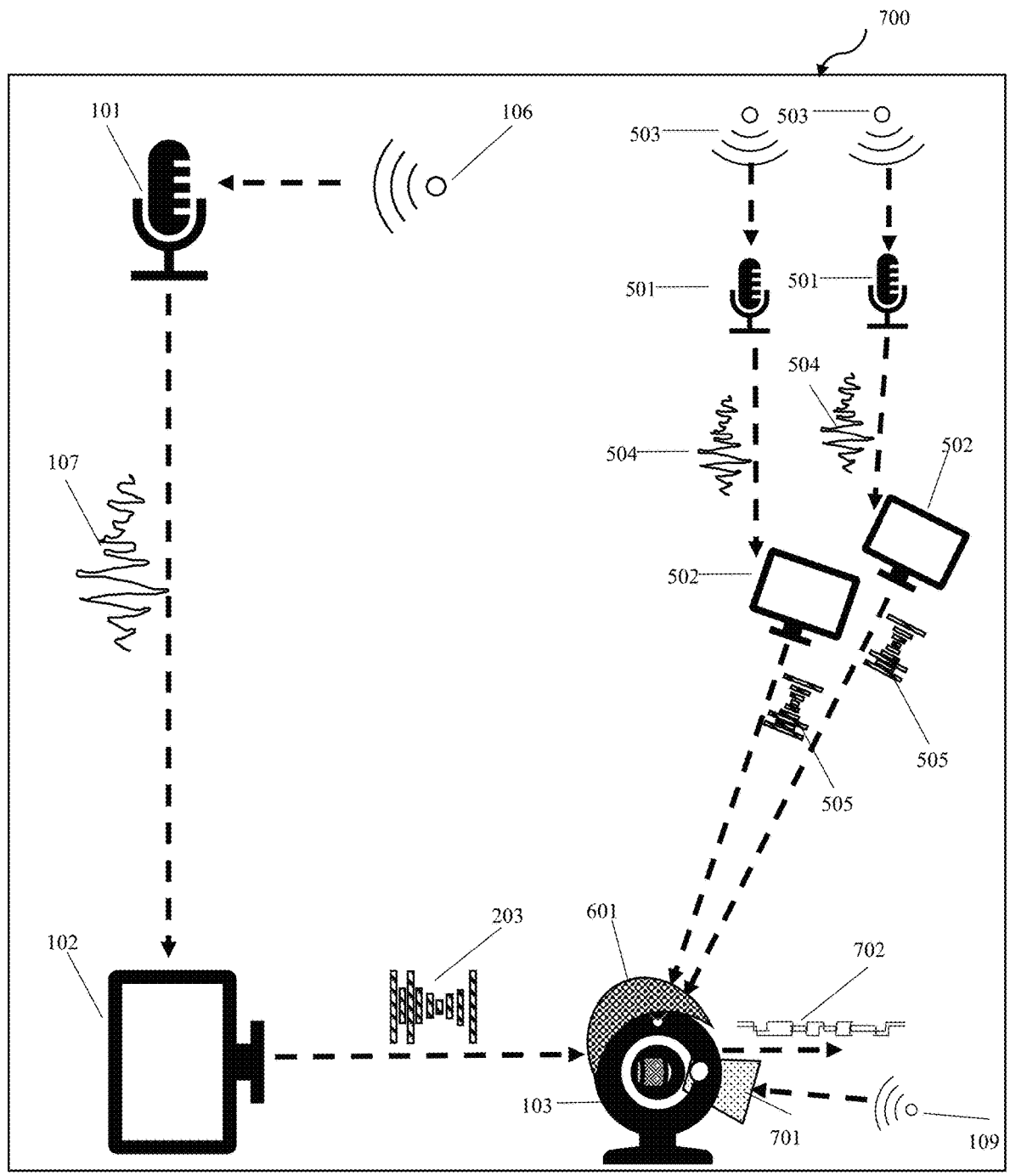
FIG. 7 depicts an acoustic waveform optimizer associated with the second transducer, according to an embodiment of this invention.

Illustration 700 of FIG. 7 depicts a waveform optimizer 701 for the second transducer 103. This waveform optimizer 701 receives acoustic waveforms 109, converts said waveform to an electrical waveform, and is configured to have this electrical waveform closely be the inverted match in amplitude and phase of the combined waveform 602 of the multiple transducer processor 601.

Figure 8:
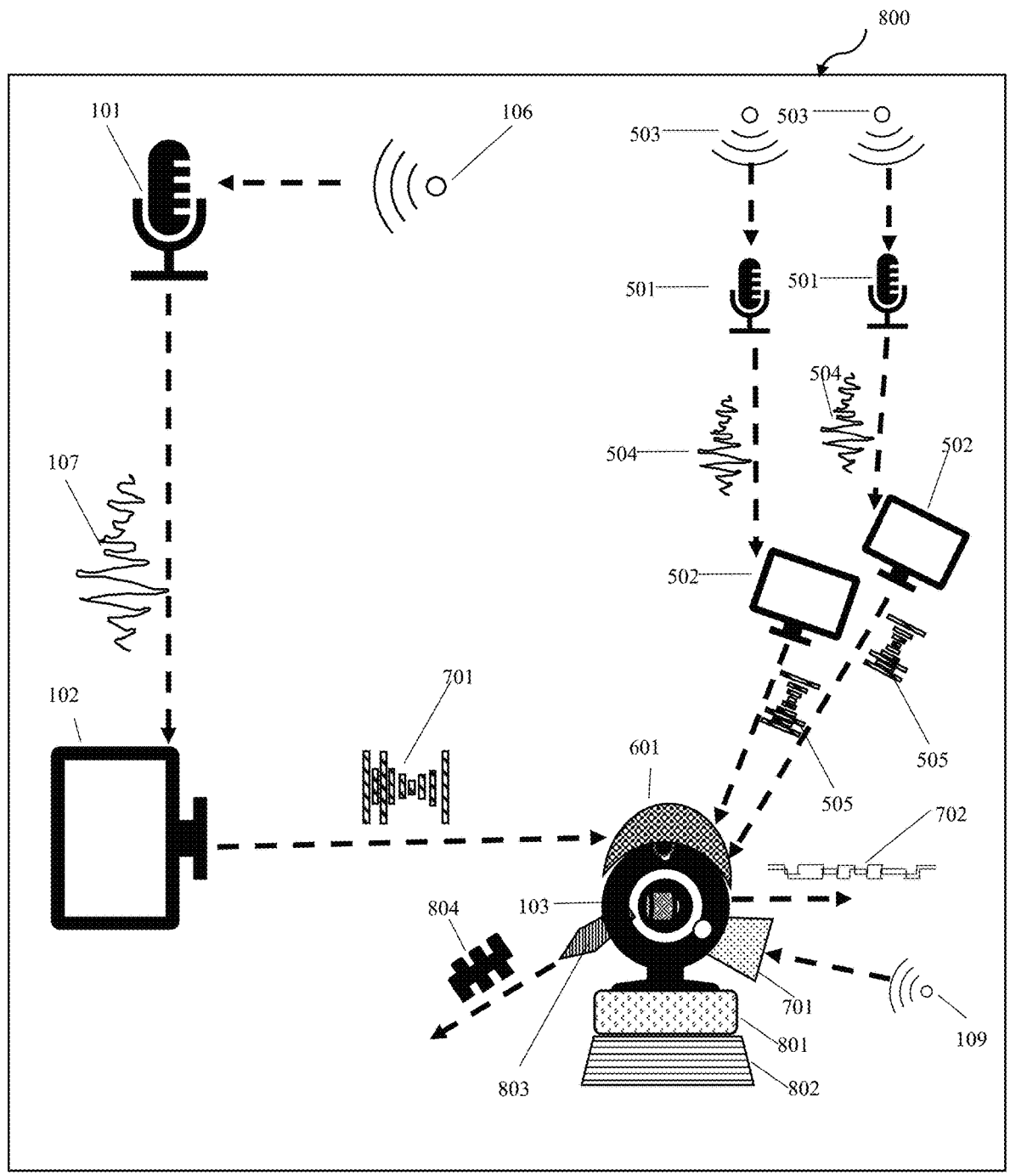
FIG. 8 depicts a waveform threshold detector and discerner, an alarm annunciator, and an enhanced waveform sensing device associated with the second transducer, according to an embodiment of this invention.

Illustration 800 of FIG. 8 depicts a waveform threshold detector and discerner 801. configured to detect a second transducer electrical waveform that exceeds a specific parameter. As one example, an extremely high amplitude acoustic waveform, regardless of frequency, would trigger this.

FIG. 8 further depicts an enhanced waveform sensing device 802 configured to detect specific acoustic and light waveform bands. As one example, breaking glass or lock picking may exhibit a sharp, short increase in acoustic waveforms. As another example, a fire or explosion would show a high amplitude increase in certain light frequencies.

FIG. 8 further depicts an alarm annunciator 803 transmit an alarm signal waveform onwards to during a predetermined threshold event. The alarm annunciator 803 sends alarm signal 804 to an external device such as a bell, visual alarm, or emergency recording.

Figure 9:
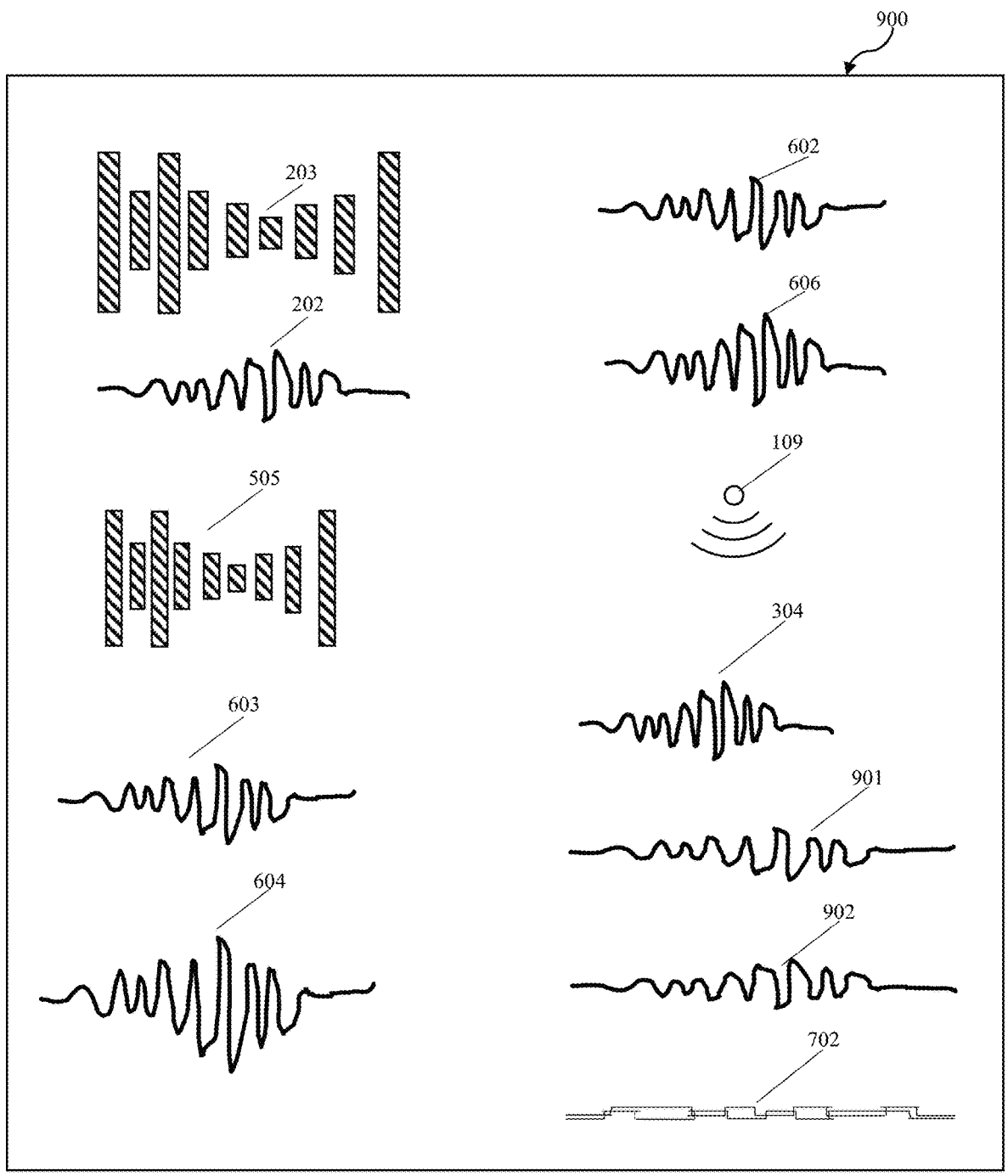
FIG. 9 depicts waveforms of the multiple first transducers and first transducer processors, waveforms of the acoustic waveform optimizer, waveforms of the waveform threshold detector and discerner, according to embodiments of this invention.

Illustration 900 of FIG. 9 depicts waveforms of the multi first transducers and first transducer processors; and waveforms of the multiple transducer processor, and waveforms of the acoustic waveform optimizer, according to an embodiment of this invention.

In one embodiment, light waveform 203 from first transducer processor and transmitter 102 becomes electrical waveform 202 inside second transducer 103. Light waveform 505 from one or more multiple primary transducer processors 502 becomes electrical waveform 603. Electrical waveform 202 and one or more electrical waveform 603 are combined to form electrical waveform 604.

In one embodiment, the combination of electrical waveform 202 and one or more electrical waveforms 603 are combined via separate series resistors of over 10,000 ohms, feeding into an input on an integrated operational amplifier.

In one embodiment, light waveform 203 from first transducer transmitter and processor 102 becomes electrical waveform 302 inside the multiple transducer processor 601. Light waveform 505 from one or more multiple primary transducer processors 502 becomes internal electrical waveform 603 inside the multiple transducer processor 601. Electrical waveform 202 and one or more electrical waveform 203 are combined to form electrical waveform 605 and can be transmitted onwards.

In another embodiment, multiple transducer processor 601 is configured to average electrical waveforms 603 to become merged electrical waveform 702, which second transducer 103 transmits onwards.

In an embodiment, the multiple transducer processor 601 is configured to have a dividing resistor network across an integrated circuit operational amplifier, to average the input waveforms.

Illustration 800 of FIG. 8 further illustrates an embodiment such that waveform optimizer 701 receives acoustic waveform 109, converts it to an internal electrical waveform 304 and processes this waveform to become internal electrical waveform 606, which is configured to be the inverted match in amplitude and phase of the combined electrical waveform 602 of the multiple transducer processor 601. This combination becomes electrical waveform 702, which is transmitted onward.

In an embodiment, waveform optimizer 701 transmits electrical waveform 606 to the non-inverting input, and electrical waveform 602 to the inverting input, of an integrated circuit operational amplifier.

In an embodiment, waveform optimizer 701 is configured to use electrical waveform 602 as a feedback control configured to adjust electrical waveform 702 for minimum amplitude.

In a further embodiment, waveform optimizer 701 is configured to use a millisecond delay network on electrical waveform 602 to adjust waveform 702 for minimum amplitude.

Illustration 900 of FIG. 9 further depicts electrical forms of the waveform threshold detector and discerner 801, the enhanced waveform sensing device 802, and the alarm annunciator 803.

In one embodiment, the waveform threshold detector and discerner 801 is configured to place electrical waveforms 602, 606 and 802 in a squelch circuit. Should the amplitude exceed a predetermined value, an internal signal is given to alarm annunciator 803 and alarm signal 804 is transmitted onward.

In one embodiment, the squelch amplitude is 10% over the resting absolute amplitude of the electrical waveforms.

Figure 10:
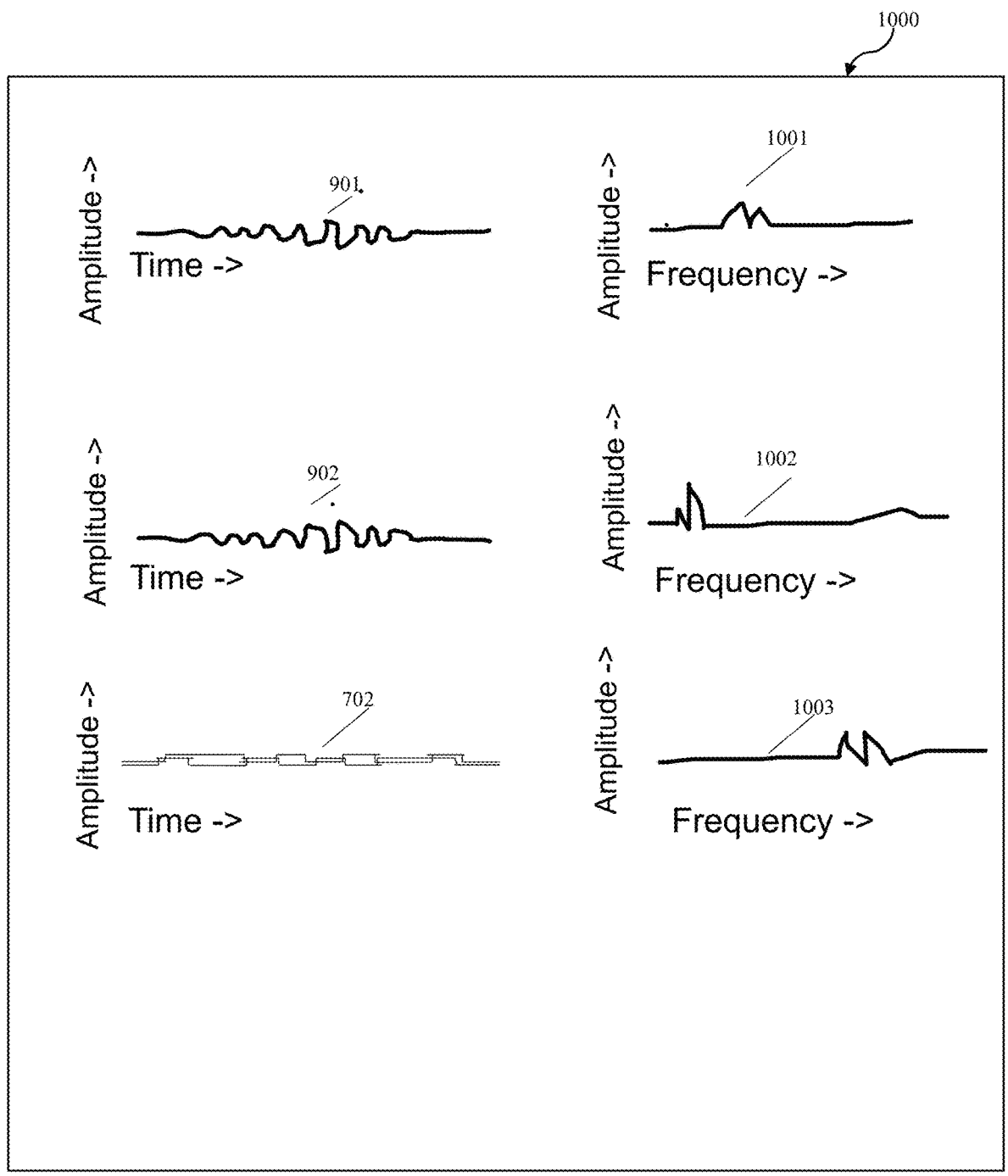
FIG. 10 depicts waveforms of the waveform threshold detector and discerner, the enhanced waveform sensing device, and the alarm annunciator associated with the second transducers, according to embodiments of this invention.

As depicted in illustration 1000 of FIG. 10, in an embodiment, the enhanced waveform sensing device 802 is configured to perform a Fast Fourier Transform (FFT) of electrical waveform 901, resulting in electrical waveform 1001; an FFT of electrical waveform 902, resulting in electrical waveform 1002, and an FFT of electrical waveform 702, resulting in electrical waveform 1003.

These FFTs are the frequency domain components of the time domain input waveforms.

In an embodiment, these FFT waveforms are the outputs of an Application Specific Integrated Circuit. (ASIC)

In one embodiment, a criterion is set as to the frequency bands of the FFT. In an embodiment, "danger bands" are expressed in FFT outputs from 10-20 Hz, which may represent building structural issues or earthquakes. Such an output is seen as electrical waveform 1001. In this embodiment, a signal may be sent to the alarm annunciator 1303 for transmission as an alarm electrical signal 1302.

In another embodiment, a criterion is set as to a "danger band" of 15,000 to 20,00, which may represent glass breaking or fire crackle. Such an output is seen as electrical waveform 1003. In this embodiment, a signal may be sent to the alarm annunciator 803 for transmission as an alarm signal 804.

Figure 11:
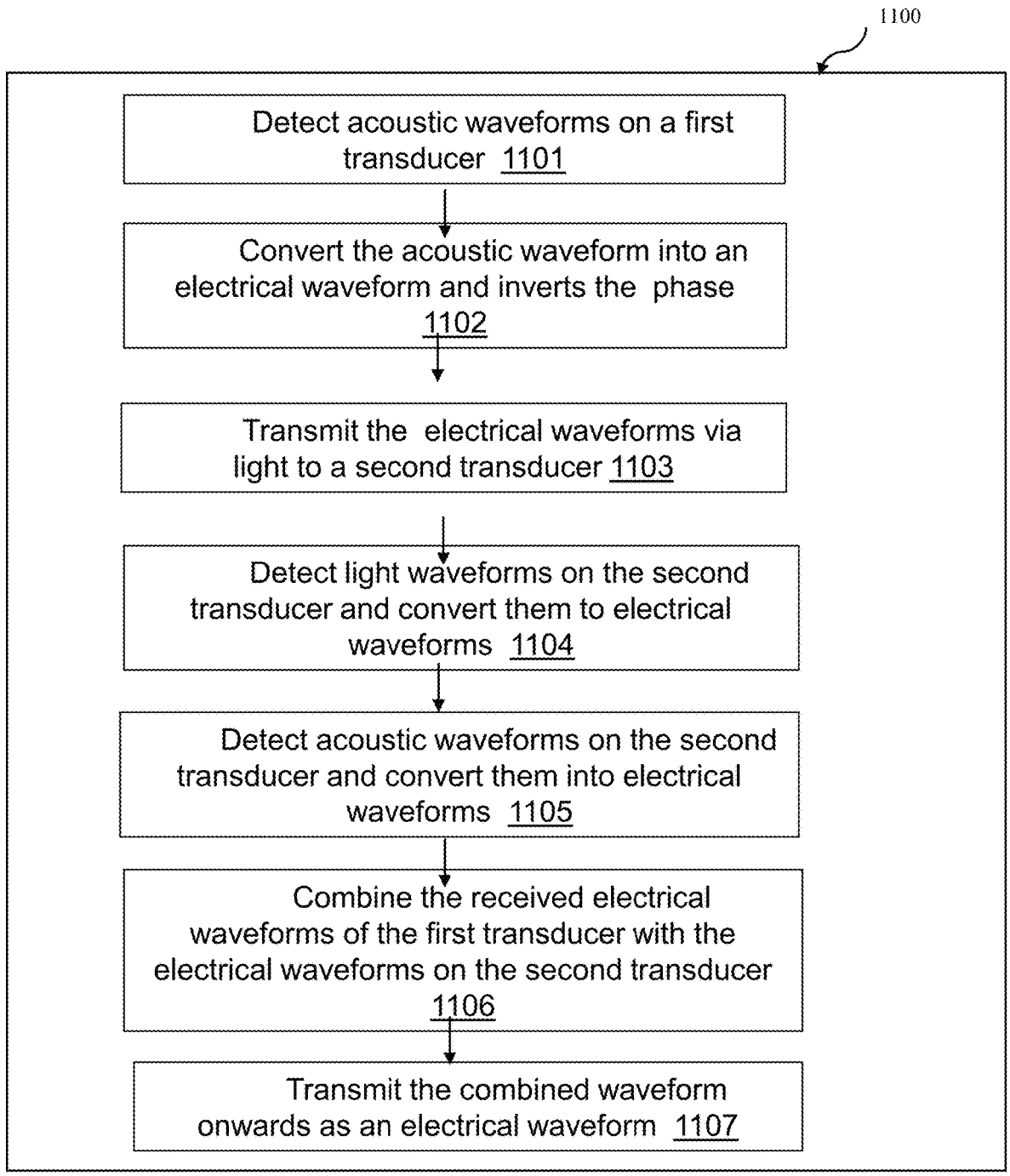
FIG. 11 depicts a method for improvement of waveform transmission and event detection, according to an embodiment of this invention.

Flowchart 1100 of FIG. 11 depicts a method for improvement of waveform transmission and event detection. As depicted, at block 1101, the method detects acoustic waveforms on a first transducer; at block 1102, the method converts the acoustic waveforms into first transducer electrical waveforms, and inverts the phase of the first transducer electrical waveforms; at block 1103, the method transmits the inverted first transducer electrical waveforms via light waveforms to a second transducer; at block 1104, the method detects on the second transducer the light waveforms and converts the light waveforms to received first transducer electrical waveforms; at block 1105, the method detects second transducer acoustic waveforms on the second transducer and converts the second transducer acoustic waveforms into second transducer electrical waveforms; at block 1106, the method combines the received first transducer electrical waveforms with the second transducer electrical waveforms; and at block 1107, the method transmits the combined waveform onwards as a combined electrical waveform.

In one embodiment, a closed room is used for audio recording. At block 1101, a first transducer receives ambient noise as an acoustic waveform and converts the acoustic waveform via microphone to an electrical waveform. At block 1102, the first transducer inverts said electrical waveform via the inverting input of an operational amplifier. At block 1103, the first transducer converts said inverted electrical waveform to a light waveform by a light power supply modulated by an electrical waveform. Further at block 1103, the light waveform is transmitted to a second transducer. At block 1104, a second transducer receives the inverted light waveform, and converts it into an electrical waveform. At block 1105, the second transducer detects acoustic waveforms on the second transducer and converts the acoustic waveforms into electrical waveforms. At block 1106 the second transducer combines the electrical waveform of said first transducer with the electrical waveform of the second transducer; and at block 1107 transmits the combines waveform onward as an electrical waveform. This electrical waveform is configured as subtractive from audio recording to reduce ambient noise.

In another embodiment, the combined transmitted electrical waveform from block 1107 is used as an alarm for glass breakage or footfalls. In this embodiment, the method records a baseline level of ambient noise over a time period, such as three-day time period. The method determines an average level of ambient noise over the recording and establishes a baseline noise threshold using the average level of ambient noise. Upon sensing a noise event above the defined threshold, such as 10% above the average ambient noise level, the method triggers an alarm.

In an embodiment, this method can further include transmitting the inverted acoustic waveform by laser light, adjusting the amplitude of said inverted waveform at selected times by a waveform optimizer, associated with said first transducer processer and transmitter; and transmitting inverted acoustic waveforms via light to the second transducer by multiple first transducers.

Figure 12:
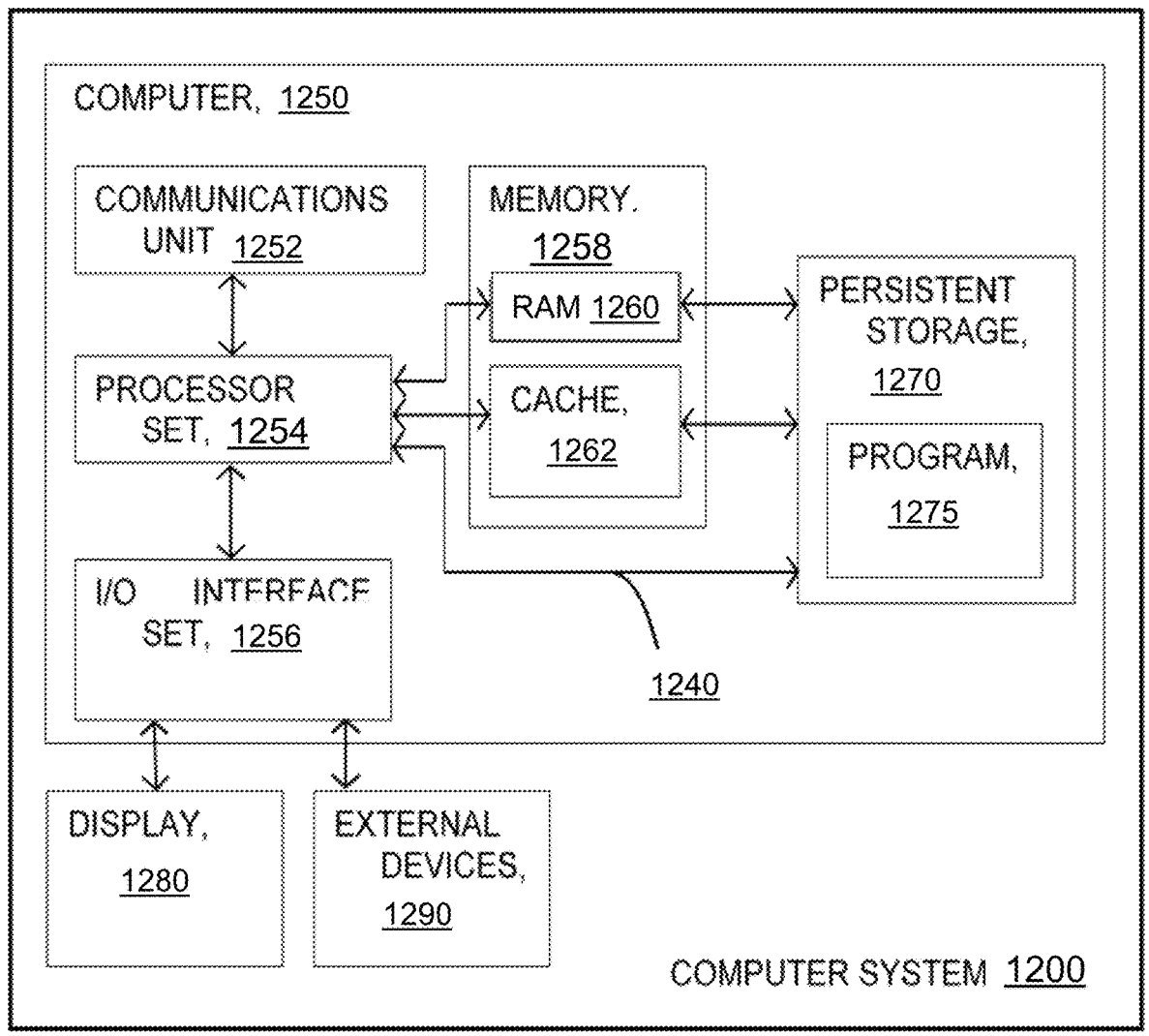
FIG. 12 depicts a schematic illustration of computing resources, according to an embodiment of the invention.

FIG. 12 provides a schematic illustration of exemplary computing resources associated with practicing the disclosed inventions. The inventions may be practiced in the processors of any of the disclosed elements which process an instruction stream. FIG. 1 depicts a block diagram of components of a computer 1250 within a networked computer system 1200, in accordance with an embodiment of the present invention. It should be appreciated that FIG. 12 provides only an illustration of one implementation and does not imply any limitations with regard to the environments in which different embodiments can be implemented. Many modifications to the depicted environment can be made.

Server computer 1250 can include processor(s) 1254, memory 1258, persistent storage 1270, communications unit 1252, input/output (I/O) interface(s) 1756 and communications fabric 1240. Communications fabric 1240 provides communications between cache 1262, memory 1258, persistent storage 1270, communications unit 1252, and input/output (I/O) interface(s) 1256. Communications fabric 1240 can be implemented with any architecture designed for passing data and/or control information between processors (such as microprocessors, communications and network processors, etc.), system memory, peripheral devices, and any other hardware components within a system. For example, communications fabric 1240 can be implemented with one or more buses.

Memory 1258 and persistent storage 1270 are computer readable storage media. In this embodiment, memory 1258 includes random access memory (RAM) 1260. In general, memory 1258 can include any suitable volatile or non-volatile computer readable storage media. Cache 1262 is a fast memory that enhances the performance of processor(s) 1254 by holding recently accessed data, and data near recently accessed data, from memory 1258.

Program instructions and data used to practice embodiments of the present invention, e.g., the waveform combining program 1275, are stored in persistent storage 1270 for execution and/or access by one or more of the respective processor(s) 1254 of server computer 1250 via cache 1262. In this embodiment, persistent storage 1270 includes a magnetic hard disk drive. Alternatively, or in addition to a magnetic hard disk drive, persistent storage 1270 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 1270 may also be removable. For example, a removable hard drive may be used for persistent storage 1270. Other examples include optical and magnetic disks, thumb drives, and smart cards that are inserted into a drive for transfer onto another computer readable storage medium that is also part of persistent storage 1270.

Communications unit 1252, in these examples, provides for communications with other data processing systems or devices. In these examples, communications unit 1252 includes one or more network interface cards. Communications unit 1252 may provide communications through the use of either or both physical and wireless communications links. Software distribution programs, and other programs and data used for implementation of the present invention, may be downloaded to persistent storage 1270 of server computer 1250 through communications unit 1252.

I/O interface(s) 1256 allows for input and output of data with other devices that may be connected to server computer 1250. For example, I/O interface(s) 1256 may provide a connection to external device(s) 1290 such as a keyboard, a keypad, a touch screen, a microphone, a digital camera, and/or some other suitable input device. External device(s) 1290 can also include portable computer readable storage media such as, for example, thumb drives, portable optical or magnetic disks, and memory cards. Software and data used to practice embodiments of the present invention, e.g., waveform combining program 1275 on server computer 1250, can be stored on such portable computer readable storage media and can be loaded onto persistent storage 1270 via I/O interface(s) 1256. I/O interface(s) 1256 also connect to a display 1280.

Display 1280 provides a mechanism to display data to a user and may be, for example, a computer monitor. Display 1280 can also function as a touch screen, such as a display of a tablet computer.

In one embodiment, as depicted in computer system 1200 of FIG. 12, and illustration 800 of FIG. 8, second transducer 103 transmits electrical waveform 702 to external device unit 1290 and then to I/O interface set 1256. I/O interface set 1256 transmit this waveform to processor set 1254, which is so configured as to determine if electrical waveform 110 varies by more than predetermined boundaries of time period, amplitude and phase. If this predetermined time period is exceeded, processor set 1254 sends an electrical alarm waveform to communications unit 1252 for further transmission onward.

In a further embodiment processor set 1254 transmits an electrical alarm waveform to I/O interface set 1256, if predetermined boundaries of time period, amplitude, and phase are exceeded. I/O interface set 1256 is so configured as to transmit this electrical alarm waveform to display 1280. Display 1280 is so configured as to confirm this electrical alarm signal to a visual alerting display on a screen.

In one embodiment, processor set 1254 has predetermined boundaries associated with signal 702 set at about plus 5% of amplitude and plus/minus 5 degrees of phase, during the local hours of 7:00 PM and 8:00 AM.

In another embodiment, second transducer 103 transmits electrical waveform 702 to external device unit 1290. External device unit 1290 transmits this signal to I/O interface set 1256, which transmits this onwards to processor set 1254.

Processor set 1254 transmits this onward via communications fabric 1240 to persistent storage 1270, for analysis by program 1275.

In one embodiment, program 1275 receives multiple copies of signal 702 from persistent storage unit 1270, and averages electrical signal excursions in amplitude and phase over a rolling period of 72 hours. The moving average of such excursions is sent to processor set 1254, which is configured so as to make this moving average the alarm boundary for the next 72 hours.

In another embodiment, first transducer 101 receives acoustic waveform 106, and converts this to first electrical waveform 107, which is sent to external device unit 1290. Second transducer 103 transmits electrical waveform 205 to external device unit 1290. External device unit 1290 sends both electrical waveforms to I/O interface set 1256. I/O interface set 1256 sends said signals to processor set 1254, which is so configured as to combine these signals, and produce an output to communications unit 1252 should the combined signal exceed a predetermined boundary.

In an embodiment, with reference to FIGS. 1, 3 and 12, first transducer processor and transmitter 102 inverts electrical waveform 107 transmits this as light waveform 203 to second transducer 103. Second transducer 103 converts into a received first internal electrical waveform (waveform 202 of FIG. 2). Second transducer 103 receives acoustic waveform 109 and converts this to a second internal electrical waveform (waveform 204 of FIG. 3). Second transducer 103 transmits first waveform 202 and second waveform 204 to external device unit 1290. External device unit 1290 sends both electrical waveforms to I/O interface set 1256. I/O interface set 1256 sends said signals to processor set 1254, which is so configured as to combine these signals. The method of an embodiment may analyze the combined waveform with reference to a threshold to determine an alarm condition. the method may pass the combined waveforms along to an external speaker as an output with reduced noise.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
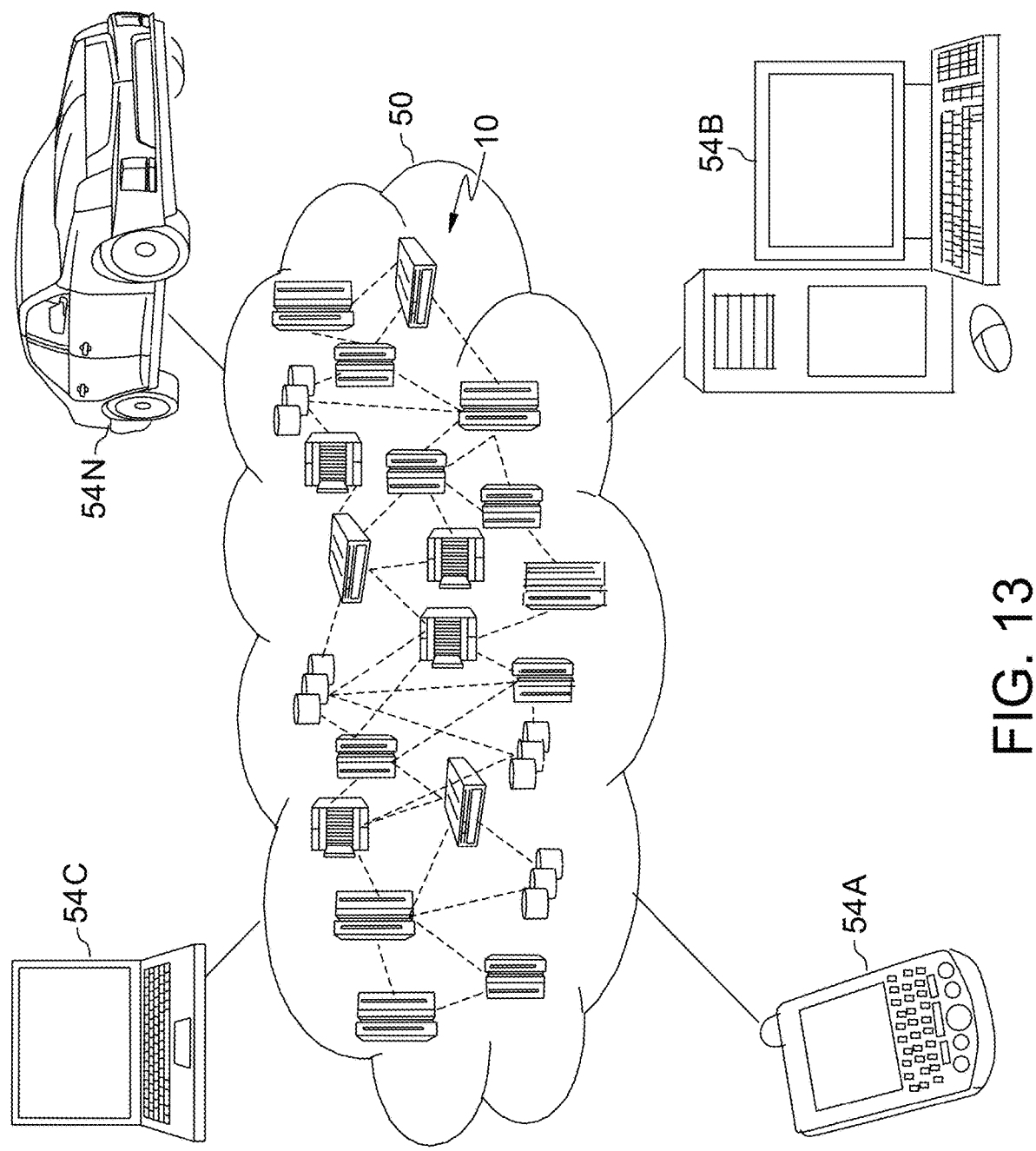
FIG. 13 depicts a cloud computing environment, according to an embodiment of the invention.

Referring now to FIG. 13, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 18 are intended to be illustrative only and that computing nodes 10 and cloud computing environment 50 can communicate with any type of computerized device over any type of network and/or network addressable connection (e.g., using a web browser).

In one embodiment as depicted in FIG. 13 and illustration 1300 of FIG. 13, first transducer 101 receives acoustic waveform 106, converts this to electrical waveform 107, transmits said electrical waveform 107 to cloud environment 50. Primary transducers 501 receive acoustic waveforms 503, convert these to electrical waveforms 504, and transmits said electrical waveforms to cloud environment 50. Within said cloud environment 50, one or more cloud computing nodes 10 are so configured to digitize these electrical waveforms, invert the phase of electrical waveform 107, and send alarms to computing devices 54 A-N should the combined waveform exceed a predetermined boundary of time period, amplitude or phase.

In one embodiment, cloud computing node 10 is configured so as to have predetermined boundaries for electrical waveform 110 set as 5% of amplitude and plus/minus 5 degrees of phase, during the local hours of 7:00 PM and 8:00 AM.

Figure 14:
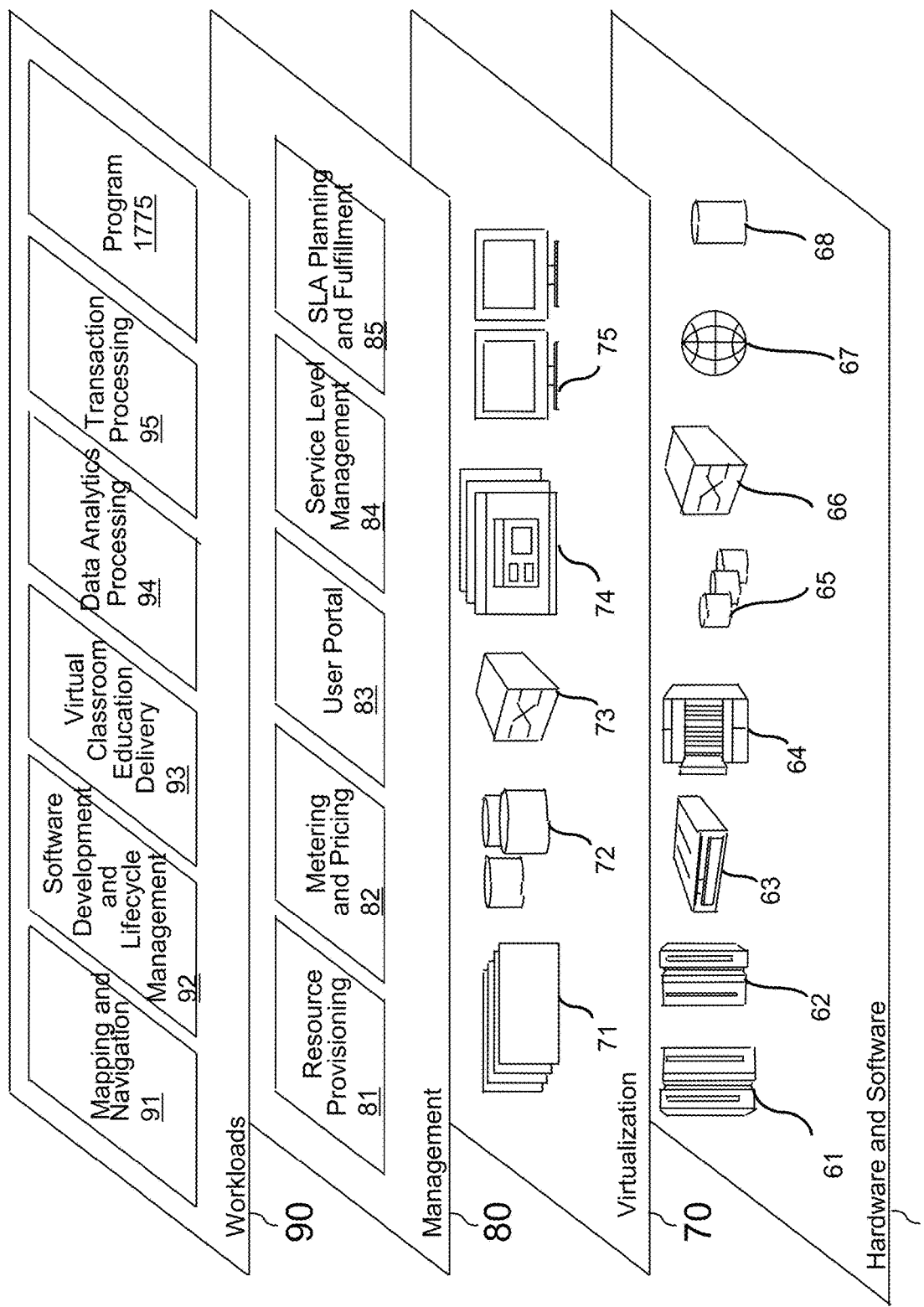
FIG. 14 depicts abstraction model layers, according to an embodiment of the invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation unit 91; software development and lifecycle management 92; virtual classroom education delivery 93; data analytics processing 94; transaction processing 95; and waveform combining program 1775.

In one embodiment, as depicted in illustration 800 of FIG. 8, first transducer 101 converts acoustic waveform 106 into electrical waveform 107, and transmits this to cloud computing environment 50 as depicted in FIG. 13. Additional primary transducers 501 convert acoustic waveforms 503 to electrical waveforms 504, which are sent to cloud computing environment 50 as depicted in FIG. 18. Second transducer 103 sends electrical signal 702 to computing environment 50. Returning to FIG. 15, Mapping and Navigation element 91 of Workload 90 is so configured as to possess updated geospatial coordinates of first transducer 101, secondary transducer 103, and primary transducers 501. Data Analytics Processing unit 94 of Workload 90 is so configured as to send an alarm to Virtual clients 75 of workload 90, if the electrical waveforms received exceed certain parameters in time, phase, and amplitude.

In one embodiment, the Data Analytics Processing 94 of Workload 90 is so configured as to send an alarm to virtual clients 75 of workload 90, if all transducer electrical waveforms which are predetermined by the Mapping and Navigation unit 91 of Workload 90 are determined to be within 100 meters of each other, and if received signals differ in time by more than 100 milliseconds.

What is claimed is:

1. A system comprising:
   a first transducer configured to receive an acoustic waveform and convert the acoustic waveform into a first transducer electrical waveform;
   a first transducer processor and transmitter configured to invert a phase of the first transducer electrical waveform, convert the first transducer electrical waveform having an inverted phase into a first transducer light waveform, and transmit the first transducer light waveform via light to a second transducer; and
   the second transducer configured to receive from the first transducer processor and transmitter the first transducer light waveform, and convert the first transducer light waveform into a received first transducer electrical waveform; to receive a second transducer acoustic waveform and convert the second transducer acoustic waveform into a second transducer electrical waveform; and to combine the received first transducer electrical waveform with the second transducer electrical waveform; and to transmit the combined first transducer electrical waveform and the second transducer electrical waveform as a combined electrical waveform.

2. The system of claim 1, wherein the first transducer processor and transmitter is further configured to convert the first transducer electrical waveforms to laser light, and transmit the first transducer electrical waveforms to the second transducer via a laser beam.

3. The system of claim 1, wherein the first transducer processor and transmitter is further configured to invert the first transducer electrical waveform, convert the inverted first transducer electrical waveform to a first transducer light electrical waveform, and transmit the first transducer light electrical waveform to the second transducer via multiple light beams.

4. The system of claim 1, wherein the first transducer processor and transmitter is further configured to transmit the first transducer light waveforms to the second transducer via omni-directional light.

5. The system of claim 1, wherein the second transducer comprises an optical aperture associated with a particular direction.

6. The system of claim 1, wherein the second transducer comprises an optical lens associated with a particular direction.

7. The system of claim 1, wherein the first transducer processor and transmitter is further configured to convert the first transducer electrical waveform to an electromagnetic radiation waveform, transmit the electromagnetic radiation waveform to the second transducer; and the second transducer is further configured to receive the electromagnetic radiation waveform.

8. The system of claim 1, further comprising multiple first transducers and multiple first transducer processors and transmitters; the multiple first transducer processors and transmitters transmitting light waveforms to the second transducer.

9. The system of claim 1, further comprising multiple transducer processors associated with the second transducer and configured to process the first transducer light waveforms from multiple first transducer processor and transmitters.

10. The system of claim 1, wherein the second transducer is further configured to combine an absolute amplitude of the second transducer electrical waveform with an absolute amplitude of the first transducer received electrical waveform, combine the second transducer electrical waveform and the first transducer received electrical waveform, and adjust the absolute amplitude of the first transducer received electrical waveform to be between 66% and 133% of the absolute amplitude of the second transducer electrical waveform.

11. The system of claim 1, further comprising a waveform optimizer, associated with the second transducer, configured to adjust an amplitude of the combined electrical waveform.

12. The system of claim 1, further comprising a waveform threshold detector and discerner, configured to detect a second transducer electrical waveform that exceeds a specific parameter.

13. The system of claim 1, further comprising an alarm annunciator configured to waveform an alarm transmitted during a predetermined threshold event.

14. The system of claim 1, the second transducer further comprising an enhanced waveform sensing device configured to detect specific acoustic and light waveform bands.

15. The system of claim 1, wherein the second transducer is further configured to adjust an absolute amplitude of the received first transducer electrical waveform according to the second transducer electrical waveform, combine the second transducer electrical waveform and the received first transducer electrical waveform; and to transmit the combined first transducer electrical waveform and the second transducer electrical waveform.

16. A computer-implemented method comprising:
receiving, by one or more computer processors, a first electrical waveform transmitted via light;
receiving, by the one or more computer processors, an acoustic waveform;
converting, by the one or more computer processors, the first electrical waveform into a second electrical waveform;
converting, by the one or more computer processors, the acoustic waveform into a third electrical waveform and inverting the third electrical waveform;
combining, by the one or more computer processors, the second electrical waveform with the inverted third electrical waveform, forming a fourth electrical waveform;
transmitting, by the one or more computer processors, the fourth electrical waveform;
defining, by the one or more computer processors, a threshold according to the fourth electrical waveform;
receiving, by the one or more computer processors, a noise event above the threshold; and
triggering, by the one or more computer processors, an alarm according to the noise event.

17. The computer-implemented method of claim 16, wherein the first electrical waveform is transmitted by laser light.

18. A computer program product, the computer program product comprising one or more computer readable storage devices and program instructions stored on the one or more computer readable storage devices, the stored program instructions comprising:
program instructions to receive a first electrical waveform associated with a light transmission;
program instructions to receive an inverted second electrical waveform associated with an acoustic transmission;
program instructions to combine the first electrical waveform and the second electrical waveform into a third electrical waveform; and
program instructions to define a threshold according to the third electrical waveform.

19. The computer program product of claim 18, the stored program instructions further comprising:
program instructions to determine an alarm condition according to the threshold; and
program instructions to transmit the alarm condition to a network device.

\* \* \* \* \*